US010387595B1

(12) United States Patent
Mani et al.

(10) Patent No.: US 10,387,595 B1
(45) Date of Patent: Aug. 20, 2019

(54) SYSTEMS AND METHODS FOR MODELING INTEGRATED CLOCK GATES ACTIVITY FOR TRANSIENT VECTORLESS POWER ANALYSIS OF AN INTEGRATED CIRCUIT

(71) Applicant: CADENCE DESIGN SYSTEMS, INC., San Jose, CA (US)

(72) Inventors: Anshu Mani, Noida (IN); Avnish Varma, Noida (IN); Suketu Desai, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 58 days.

(21) Appl. No.: 15/590,914

(22) Filed: May 9, 2017

(51) Int. Cl.
*G06F 17/50* (2006.01)

(52) U.S. Cl.
CPC ...... *G06F 17/5031* (2013.01); *G06F 17/5036* (2013.01); *G06F 2217/78* (2013.01); *G06F 2217/84* (2013.01)

(58) Field of Classification Search
CPC ............. G06F 17/5031; G06F 17/5036; G06F 2217/78; G06F 2217/84
See application file for complete search history.

(56) References Cited

U.S. PATENT DOCUMENTS

| | | | | |
|---|---|---|---|---|
| 8,051,399 B2 * | 11/2011 | Vishweshwara | .... | G06F 17/5031 716/108 |
| 8,056,033 B2 * | 11/2011 | Nakashima | ......... | G06F 17/5036 716/100 |
| 8,095,900 B2 * | 1/2012 | Sircar | ................... | G06F 17/505 716/104 |
| 8,365,125 B1 * | 1/2013 | Rochel | ................ | G06F 17/5036 716/106 |
| 8,601,420 B1 * | 12/2013 | Keller | ................. | G06F 17/5036 716/108 |
| 9,135,375 B1 * | 9/2015 | Sood | ........................ | G06F 17/50 |
| 9,672,305 B1 * | 6/2017 | Vats | ....................... | G06F 17/505 |
| 9,820,229 B2 * | 11/2017 | Homchaudhuri | .......................... | H04W 52/0216 |
| 9,881,112 B1 * | 1/2018 | Zhang | ................... | G06F 17/505 |

(Continued)

OTHER PUBLICATIONS

Ren et al.; "A Vectorless Approach for Predicting Switching Activity in a Digital Circuit"; Year: 2016; IEEE Transactions on Electromagnetic Compatibility; vol. 58, Issue: 3; pp. 828-835.*

(Continued)

*Primary Examiner* — Helen Rossoshek
(74) *Attorney, Agent, or Firm* — Eric L. Sophir; Dentons US LLP

(57) ABSTRACT

Disclosed herein are embodiments of systems and methods for a deterministic modeling of integrated clock gate (ICG) activity in a vectorless power analysis of a synthesized integrated circuit (IC) design. The systems and methods may generate a priority list of the ICGs based on the slack values of the outputs of the ICGs calculated from a static timing analysis (STA). The system and method may further receive one or more priority inputs from the user and select the ICGs to be activated during power analysis based on the priority list and the priority inputs from the user. The systems and methods may propagate a set of state stimuli through the output cones of the selected ICGs and calculate the current through and power consumed by circuit devices in the output cones based on the state propagation and global data activity.

20 Claims, 3 Drawing Sheets

(56) References Cited

U.S. PATENT DOCUMENTS

| | | | |
|---|---|---|---|
| 9,939,880 B1* | 4/2018 | Foreman | G06F 17/5045 |
| 2007/0234254 A1* | 10/2007 | Yoshimura | G06F 17/5031 |
| | | | 716/114 |
| 2015/0199462 A1* | 7/2015 | Chang | G06F 17/5031 |
| | | | 716/108 |
| 2015/0212152 A1* | 7/2015 | Agarwal | G01R 31/31707 |
| | | | 714/731 |
| 2018/0121585 A1* | 5/2018 | Cherupalli | G06F 17/5031 |

OTHER PUBLICATIONS

Lin et al.; "Full-chip vectorless dynamic power integrity analysis and verification against 100uV/100ps-resolution measurement"; Year: 2004; Proceedings of the IEEE 2004 Custom Integrated Circuits Conference (IEEE Cat. No.04CH37571); pp. 509-512.*

* cited by examiner

SYSTEMS AND METHODS FOR MODELING INTEGRATED CLOCK GATES ACTIVITY FOR TRANSIENT VECTORLESS POWER ANALYSIS OF AN INTEGRATED CIRCUIT

TECHNICAL FIELD

This application relates generally to the field of electronic circuit design, and more specifically to calculate a power consumption of a synthesized integrated circuit.

BACKGROUND

Modern semiconductor based integrated circuits (ICs) are incredibly complex and contain millions of circuit devices, such as transistors, and millions of interconnections between the circuit devices. Designing, testing, and verifying the functionality of such complex circuits cannot be accomplished manually, and circuit designers use computer based Electronic Design Automation (EDA) tools for schematics, layouts, simulation, and verification of the complex circuits. In additional to designing an IC with the correct functionally, another equally significant function of the EDA tools is to optimize the IC design. One of the optimization targets is to reduce power consumption by the fabricated IC. In addition to consuming less power and offering a longer battery life, an IC with reduced power consumption generates less heat and does not require elaborate heat dissipation mechanism. In this age of portable and yet incredibly complex electronics, ICs with reduced power consumption have therefore been increasingly relevant and sought after.

To allow a circuit designer to optimize power consumption, EDA tools offer power consumption verification of an IC design. Conventional EDA tools generally use vector-based power analysis, in which an IC design is simulated by feeding a test vector of inputs. The simulation then generates value change dump (VCD) files based on the simulation. The VCD files can be parsed to determine the current flow through circuit instances in the IC design. The current flow can be then used to calculate the power consumed by the circuit instances. However, as the complexity of ICs has been increasing exponentially, vector-based power analysis has become computationally expensive as the entire IC has to be simulated for multiple clock-cycles to generate the VCD files. Furthermore, significant computation resources have to be expended to parse the generated VCD files, determine the current flowing through various circuit instances, and calculate the power consumed by the IC.

Vectorless power analysis can be a computationally efficient alternative for a full-fledged vector-based power analysis. However, conventional EDA tools offer vectorless power analysis based on an assumption of the worst case scenario. More specifically, conventional EDA tools assume that all of the integrated clock gaters (ICGs, used to selectively turn off unrequired portions of the IC) are turned on all the time. In other words, conventional EDA tools assume that all portions of the IC to be active for a power analysis, which leads to an overly pessimistic power consumption assessment. Such pessimistic assessment may not present the true behavioral picture of the IC. Furthermore, the pessimistic assessment may lead the conventional EDA tools and/or the circuit designer to undertake unnecessary optimizations to further reduce power consumption.

What is therefore required is an EDA tool that breaks the aforementioned worst case scenario assumption that the entire clock network is toggling and can select particular ICGs and the corresponding logic cones to be turned on for a vectorless power analysis. What is also required is an EDA tool that provides a more realistic behavioral picture of the IC in terms of power consumption and offers a vectorless power analysis that closely approximates vector-based power analysis.

SUMMARY

Embodiments disclosed herein solve the aforementioned problems and other problems. More specifically, embodiments herein describe an EDA computer system and an EDA method that may generate a priority list of ICGs based on the slack values calculated from a static timing analysis (STA). The EDA computer system may further receive one or more priority inputs from a user and apply the one or more priority inputs to select the ICGs to be activated (or turned on) during a power analysis. The EDA computer system may propagate a set of state stimuli in the output cone of the selected ICGs and calculate the current generated in the circuit devices by the set of state stimulus. During each clock cycle, the EDA computer system may propagate the state of a first set of synchronous circuit devices to a next set of synchronous circuit devices and calculate the power consumed by the circuit at each clock cycle using this state propagation model. Selectively activating the ICGs based on the slack values and the user inputs and propagating the states based on global activity allows the EDA computer system to break the worst case scenario assumption in the conventional EDA tools and thereby generate a more realistic power consumption behavior of the integrated circuit being tested and verified.

In an embodiment a computer implemented method comprises: receiving, by a computer system, a netlist comprising database records of circuit devices and nets interconnecting the circuit devices forming an integrated circuit, wherein the circuit devices comprise a plurality of integrated clock gaters (ICGs), a plurality of synchronous circuit devices, and a plurality of combinational logic gates; calculating, by the computer system, respective slack values associated with the plurality of ICGs based on static timing analysis (STA) of the integrated circuit; generating, by the computer system, a priority list of the ICGs based on the slack values, wherein the ICGs with lower slack values are assigned a higher priority; receiving, by the computer system from a user, one or more priority inputs identifying one or more ICGs to be prioritized during a power analysis; selecting, by the computer system, a set of ICGs to be activated during the power analysis based on the priority list and the one or more priority inputs; propagating, by the computer system, a set of state stimuli to the circuit devices within the respective output cones of the selected ICGs; determining, by the computer system, respective currents introduced by the set of state stimuli across the circuit devices within the respective output cones of the selected ICGs; and determining, by the computer system, power consumed by each of the circuit devices within the respective output cones of the selected ICGs based on the respective currents and the respective voltages across each of the circuit devices.

In another embodiment, system for vectorless power analysis of an integrated circuit comprises: one or more computers comprising a non-transitory machine-readable media configured to store a plurality of database records of circuit devices and nets interconnecting the circuit devices forming an integrated circuit, wherein the circuit devices comprise a plurality of integrated clock gaters (ICGs), a plurality of synchronous circuit devices, and a plurality of combinational logic gates; at least one computer of the one or more computers, the at least one computer coupled to the non-transitory machine readable media storing the plurality of database records and comprising a processor configured to: calculate respective slack values associated with the plurality of ICGs based on static timing analysis (STA) of the integrated circuit; generate a priority list of the ICGs based on the slack values, wherein the ICGs with lower slack values are assigned a higher priority; receive one or more priority inputs identifying one or more ICGs to be prioritized during a power analysis; select a set of ICGs to be activated during the power analysis based on the priority list and the one or more priority inputs; propagate a set of state stimuli to the circuit devices within the respective output cones of the selected ICGs; determine respective currents introduced by the set of state stimuli across the circuit devices within the respective output cones of the selected ICGs; and determine power consumed by each of the circuit devices within the respective output cones of the selected ICGs based on the respective currents and the respective voltages across each of the circuit devices.

BRIEF DESCRIPTION OF THE DRAWINGS

The accompanying drawings constitute a part of this specification and illustrate embodiments of the subject matter disclosed herein.

DETAILED DESCRIPTION

Figure 1:
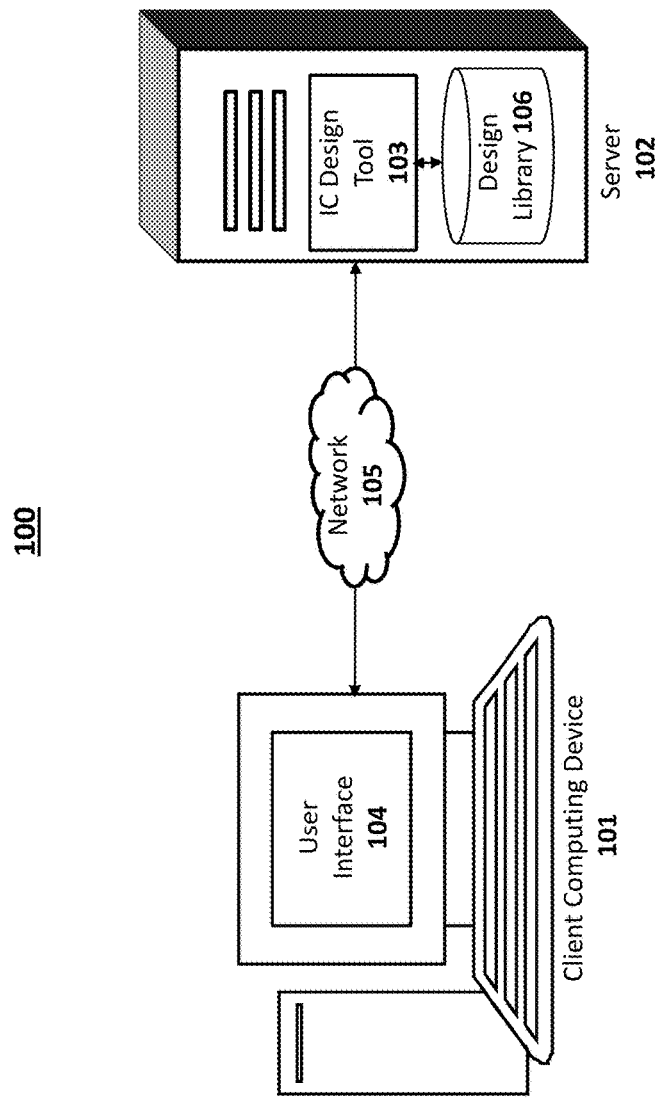
FIG. 1 shows an exemplary system for a vectorless power analysis of a synthesized integrated circuit design, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments of the systems, products and methods disclosed herein solve a specific technical problem arising in the realm of computer based vectorless power analysis of a synthesized integrated circuit design. More specifically, an EDA computer system disclosed herein may break the worst case scenario assumption of the conventional EDA tools. To that end, the EDA computer system may execute one or more software modules to perform a static timing analysis (STA) to calculate the slack value for the output of each of the ICGs in the integrated circuit. The EDA computer system may generate a priority list of the ICGs based on the slack values wherein the ICGs associated with lower slack values are assigned higher priorities. A lower slack value at a point in the circuit corresponds to a higher timing criticality of the point. In other words, a circuit component with a least slack value (or alternatively worst slack value) may fall within the most timing critical path of the circuit. Therefore, the EDA computer system may generate the priority list by prioritizing the ICGs within the most timing critical portions of the integrated circuit design being tested and verified. During the power analysis, the EDA computer system may activate ("turn on") the ICGs associated with higher priorities.

The EDA computer system may further allow a user (e.g., a circuit designer) to provide priority inputs and use the received priority inputs to select the ICGs to be activated. The priority inputs may for example identify one or more ICGs to be always selected during a power analysis. As another example, the priority inputs may include a fraction or a percentage of ICGs to be selected during the power analysis. When the EDA computer system receives a fraction or a percentage of the ICGs to be selected, the EDA computer system may apply the fraction or the percentage to the priority list to select the ICGs to be activated during the power analysis. For example, the priority input may specify that 25% of the ICGs are to be selected, and the EDA computer system may select the top fourth ICGs in the priority list during the power analysis.

After the EDA computer system selects the ICGs to be activated during the power analysis, the EDA computer system may provide and propagate a set of state stimuli to the output cone of the selected ICGs. For instance, during setup, the EDA computer system may set the states of a first set of flops (or any other type of synchronous circuit device) in the output cone of the selected ICGs. During a first clock cycle, the computer system may the state of the first set of flops to a second set of flops through a first set of combination logic clusters, wherein the second set of flops may be downstream of the first set of flops and the first set of combination logic cluster may be in between the first and second set of flops. As the respective states of the first set of flops and the second set of flops are toggling based on the state propagation, the EDA computer system may calculate the current flowing through the circuit devices. In some embodiments, the EDA computer system may calculate the current flowing through the synchronous devices, and in other embodiments the EDA computer system may calculate the current flowing through both synchronous devices and asynchronous devices.

Throughout multiple succeeding clock cycles, the EDA tool may propagate the states of the flops and calculate the currents flowing through the flops and/or the associated combination logic clusters. As the circuit is toggling in these clock cycles, the EDA tool may select the flops and/or combination logic clusters to calculate current on the global data activity in the circuit. For example, the state propagation in the successive clock cycles in the output cone of the selected ICGs may be based upon data received from other portions of the circuit. One or more flops and/or combination logic gates may remain active or inactive based upon the data received from other portions of the circuit. During the power analysis, the EDA tool may therefore select the active circuit devices to measure current, wherein the activity/inactivity of the circuit devices is based upon the global data activity of the circuit.

Based on the respective current calculations, the EDA computer system may determine the power consumption of each circuit device. To that end, the EDA computer system may determine the voltage across the circuit devices and then determine the power across the circuit devices using the electrical power equation P=IV. From the power of the circuit devices, the EDA computer system may determine the total power consumption of the circuit for each clock cycle. As the computer system has selected the ICGs based upon the slack values and user inputs and has selected the circuit devices in the output cones of the selected ICGs based on global data activity, the power consumption calculation may be close to a full-fledged vector-based power verification and analysis. In other words, the EDA computer system presents a computationally efficient power calculation that closely approximates the computationally heavy exact power verification using the vector-based tools.

FIG. 1 illustrates an electronic design automation (EDA) system 100, according to an exemplary embodiment. The electronic design automation system 100 may include any number of computing devices; the exemplary embodiment may include a client computing device 101 and a server 102. One or more components of the electronic design automation system 100 may be grouped and referred to as an electronic design automation tool (or EDA tool). The client 101 may be connected to the server 102 via hardware and software components of one or more networks 105. A network 105 may also connect various computing devices with databases or other components of the system 100. Examples of the network 105 include, but are not limited to, Local Area Network (LAN), Wireless Local Area Network (WLAN), Metropolitan Area Network (MAN), Wide Area Network (WAN), and the Internet. The communication over the network 105 may be performed in accordance with various communication protocols, such as Transmission Control Protocol and Internet Protocol (TCP/IP), User Datagram Protocol (UDP), and IEEE communication protocols.

A client computing device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client computing device 101 may be configured to communicate with one or more servers 102 of the system 100 through one or more networks 105, using wired and/or wireless communication capabilities. A user interface 104 in the client computing device 101 may include a Graphical User Interface (GUI) that renders an interactive, graphical representation of an IC design, layout, schematic, or other logical representation of an IC that is being designed, optimized, and verified using an IC design tool 103. The GUI 104 may provide interactive elements, such as graphical representations of IC design elements for a user to manipulate, optimize, and/or verify the IC design layout. In some embodiments, the user interface 104 may include a text based interface allowing the user to enter manual commands for designing, optimizing, and verifying the IC design layout. The user interface 104 may render the results of various verification commands such as power verification commands.

A server 102 may be accessible to the client device 101 via one or more networks 105. The server 102 may be any computing device comprising a processor and other computing hardware configured to execute an IC design tool 103 software module (e.g., EDA design or verification software) that may analyze, optimize, and verify an IC design. In operation, using a client device 101 to access a design tool 103 hosted on a server 102 over a network 105, a circuit designer may interact with the IC design tool 103, through a number of input devices of the client device 101, such as by inputting a selection as with a mouse or inputting a request as with a keyboard. The IC design tool 103 may generate any number of graphical interface 104 responses based on the inputs received from the client device 101, and then send the data back to the client device 101 to be rendered on the GUI 104.

The server 102 may execute one or more component software modules of the IC design tool 103 software program, which may be a software program that allows users (e.g., engineers, circuit designers) to design, optimize, and verify circuit designs through software modules. The IC design tool 103 may provide users with interactive design interfaces 104 for designing an IC and the various design elements, execute automated optimization processes, execute automated layout-generation processes, and execute verification processes. The server 102 may comprise, or may be in networked-communication with, non-transitory machine-readable media configured to store a netlist of or any other file including records of IC design elements, which may be a machine-readable computer file or a design database containing one or more records of design elements (e.g., circuit devices, pulls, fixed cells) of the IC design. In Operation, the IC design tool 103 may analyze and optimize the design elements of the netlist or any other type of file associated with the IC design. Non-limiting examples of circuit devices may include memory devices (e.g., D flip-flops, T flip-flops, SR flip flops, JK (flip flops), combination logic gates (e.g., AND, OR, NOT, NOR, NAND, XOR), and multiplexers, among others. The netlist or any other type of file may also include records of a plurality of nets. The nets may be the records associated with the wires interconnecting the plurality of circuit devices. The IC design tool 103 may further verify the functionality of the IC design, for example, whether the IC design performs within one or more constraints. For instance, the IC design 103 may perform a power analysis to verify that an IC design or a portion thereof performs within a pre-selected power constraint.

The server 102 may include a design library 106 that is accessed by the IC design tool 103. The design library 106 may include instances of various circuit devices, for example, transistors used to layout an IC. In some embodiments, the design library 106 may include instances of pcells used by the IC design tool 103 to generate an IC layout. An instance of a pcell may represent electronic circuit components such as a transistor, transmission line, or an optical fiber line. The IC design tool 103 may use instances of pcells in the design library 106 to generate a netlist of an IC that can be sent to a manufacturing facility for fabrication.

The exemplary system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities)

In operation, the system 100 may receive a netlist defining an IC design and receive one or more commands to execute power verification and analysis processes to verify that the IC design or the portion thereof is within a power constraint. The system 200 may perform static timing analysis (STA) to calculate the slack values of each ICG in the IC design. Based on the slack values, the system 100 may generate a priority list of the ICGs wherein the ICGs associated with lower slack values receive higher priorities. Furthermore, the system 200 may receive one or more priority inputs from a user. Based on the priority list and the one or more priority inputs, the system 100 may select a set of ICGs to be activated during the power analysis and provide a set of state stimuli to the output cone of the active ICGs. The system may calculate the power consumed by the circuit devices within the output cone of the active ICGs based on the state stimuli and global data activity.

Figure 2:
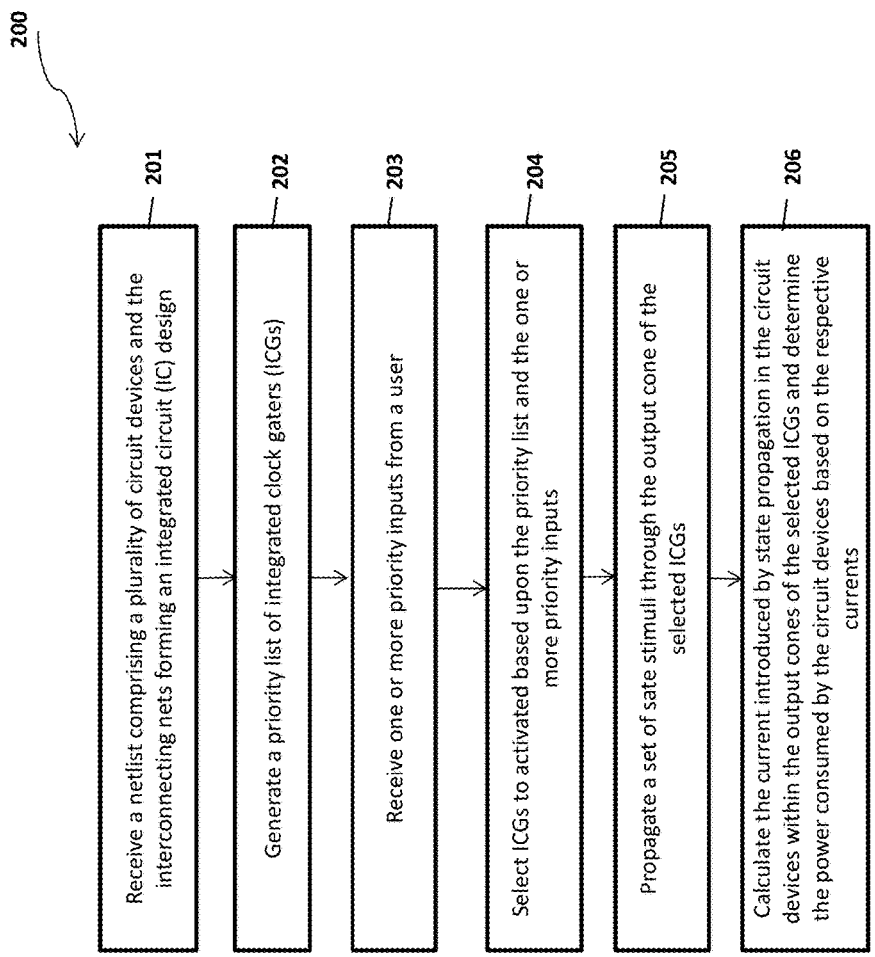
FIG. 2 shows an exemplary method for a vectorless power analysis of a synthesized integrated circuit design, according to an exemplary embodiment.

FIG. 2 shows an exemplary method 200 for power analysis and verification of an integrated circuit (IC) design. Although one or more computing devices and one or more databases may implement one or more steps of the method 200, the following description details, for brevity, a computer system implementing the steps of the method 200. One having skill in the art will appreciate that some embodiments may comprise additional or alternative steps, or may omit several steps altogether.

In a first step 201, the computer system may receive a netlist comprising a plurality of circuit devices and interconnecting nets forming an integrated circuit (IC) design. In some embodiments, the netlist may have been generated by the computer system using the same software modules implementing the various steps of the exemplary method 200. In other implementations, the netlist may have been generated by the computer system executing other software modules. The plurality of circuit devices may include various combination logic devices, such as OR, AND, NOR, NAND, and XOR gates; synchronous devices such as flip-flops (commonly known as flops) and latches; and other circuit devices such buffers, inverters, integrated clock gaters (ICGs). The interconnecting nets may connect the plurality of the circuit devices and may include power nets carrying power to the circuit devices and signal nets carrying clock signals or data signals. Together with the netlist, the computer system may receive one or more commands from a user to verify or analyze the power performance of the IC design or a portion thereof.

In a next step of 202, the computer system may generate a priority list of the ICGs. In some implementations, the computer system may execute static timing analysis (STA) software modules to compute slack values at each ICG output. A slack for a port of a circuit device (for example, an ICG output port) may be the difference between an arrival time and a required time associated with the port. An arrival time for the port may be time elapsed before a signal arrives at the port compared to a reference time. A reference time for the arrival time may be the triggering edge of the clock cycle as seen by the circuit device. A required time for a port may be the latest time at which a signal can arrive at the port without making the clock cycle any longer. Based on the slack values, the computer system may generate a priority list of ICGs. For example, the computer system may generate a priority list of ICGs assigning a higher priority to the ICGs associated with the least slack values at respective ICGs ports. One ordinary skill in the art understands that the circuit devices least slack values (or the worst slack values) provide the least timing flexibility and therefore are deemed to be within a timing critical path. Therefore within the priority list of the ICGs, the computer system may arrange ICGs according to the timing criticality. In some implementations, the computer system may generate the priority list of the ICGs based a previously executed static timing analysis (STA). The STA may have generated one or more output files comprising slack values at each ICG output in the IC.

In a next step of 203, the computer system may receive one or more priority inputs from a user. The one or more priority inputs may identify the ICGs that the computer system should activate for the power analysis. Based on the one or more priority inputs, the computer system may assign the highest priority to the ICGs identified in the one or more priority inputs. In some implementations, the one or more priority inputs may include the percentage or fraction of the ICGs to be turned on the power analysis. For example, a priority input may indicate that the computer system should activate 50% of the ICGs in the design.

In a next step 204, the computer system may select ICGs to be activated (or turned on) based upon the priority list and the one or more priority inputs. In some embodiments, the priority list may contain all the ICGs in the IC, each ICG being assigned a priority. For instance, an exemplary priority list may contain the ICGs according to the priority determined based on the respective slack values the output port of the ICGs. In some embodiments, the priority list may contain a portion ICGs, wherein each ICG is assigned a priority and/or arranged according to the priority. From the priority list, the computer system may select the ICGs to be turned on based on the one or more priority inputs. For instance, the one or more priority inputs may identify one or more ICGs to have a highest priority, and the computer system may select the ICGs such identified by the one or more user inputs.

In addition or as an alternative to identifying one or more ICGs, the one or more priority inputs may indicate a fraction or a percentage of the ICGs to be turned on. The computer system may use the fraction or the percentage to the select the ICGs to be turned on during power analysis. For instance, the one or more priority inputs may indicate that the 50% of the ICGs in the IC should be turned, and the computer system may accordingly select the top half ICGs in the priority list. One having ordinary skill in the art recognizes that the aforementioned one or more priority inputs from the user are merely exemplary and other form of user inputs are considered to be within the scope of this disclosure.

In a next step 205, the computer system may propagate a set of state stimuli to the through the output cone of the selected ICGs. For example, the computer system may provide inputs to a set of sequential circuit devices (e.g., flops) at the beginning of a logic cone of a selected ICG. The computer system may then propagate the state the set of sequential elements through downstream combinational circuit devices and sequential circuit devices, as detailed in step 206 below.

In a next step 206, the computer system may calculate current flowing through a plurality of circuit devices in the logic cone of each activated ICG and determine the power consumed by the circuit devices based on the current. For example, for a first activated ICG the computer system may compute the respective currents in both the combinational circuit devices and synchronous (or sequential) circuit devices in the output cone of the first activated ICG. In some implementations, the computer system may compute the respective currents in only the synchronous circuit devices in the output cone of each of the ICGs.

The computer system may compute the respective currents for an output cone of an activated ICG for each clock cycle based upon state propagation and global data activity. For instance, an output cone for an activated ICG may contain a first, second, and third set of flops and a first, second, and third set of combination logic. The first set of combination logic may follow the first set of flops, the second set of combination logic may follow the second set of flops, and third set of combination logic may follow the third set of flops. In a first clock cycle, the computer system may propagate the state of the first set of flops through the first set of combination logic to the second set of flops. As the state is being propagated during the first clock cycle, the computer system may compute the current across each of the flops in the first set of flops and/or the current across each logic gate in the first set of combination logic. The computer system may also determine the voltages across each flop in the first set of flops and the voltages across each logic gate in the first set of combination logic. Based on the respective voltages and currents, the computer system may calculate the power consumed by each flop in the first set of flops and/or each logic gate in the first set of combination logic. The computer system may further calculate the total power consumed by the output cone for the activated ICG during the first cycle, where the total power consumed may be the power consumed by the first set of flops and the first set of combination logic.

In a second clock cycle, the computer system may propagate the state of the second set of flops through the second set of combination logic to the third set of flops. As the state is being propagated during the second clock cycle, the computer system may compute the current across each of the flops in the second set of flops and/or the current across each logic gate in the second set of combination logic. The computer system may also determine the voltages across each flop in the second set of flops and the voltages across each logic gate in the second set of combination logic. Based on the respective voltages and currents, the computer system may calculate the power consumed by each flop in the second set of flops and each logic gate in the second set of combination logic. The computer system may further calculate the total power consumed by the logic cone for the activated ICG during the second cycle, where the total power consumed may be the power consumed by the second set of flops and the second set of combination logic.

One having ordinary skill in the art understands that the computer system may propagate the state of synchronous circuit devices (e.g., the flops as described above) further into the output cone of the activated ICG. For each of the state propagations during each clock cycle, the computer system may calculate the power consumed by the synchronous circuit devices and/or the combinational circuit devices (e.g., logic gates). One having ordinary skill in the art further understands that the state propagation and other data activity in the output cone of the activated ICG may depend upon data activity outside of the output cone. However, although the data activity outside of the output cone of the activated ICG affects the state propagation, it may not affect the aforementioned power calculation.

Figure 3:
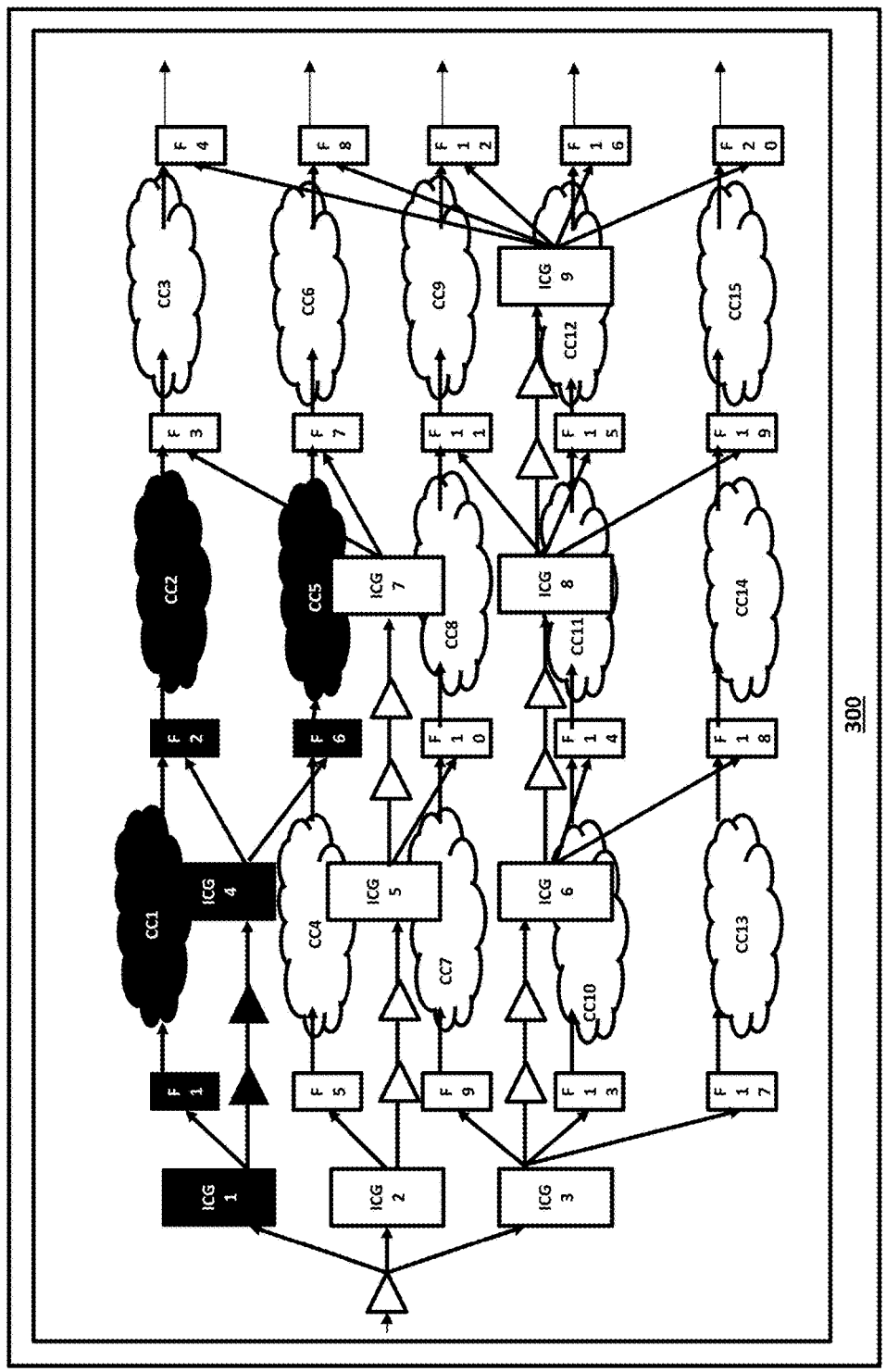
FIG. 3 shows an exemplary graphical user interfaces (GUI) generated by electronic design automation (EDA) tool during a vectorless power analysis of a synthesized integrated circuit design, according to an exemplary embodiment.

FIG. 3 shows an exemplary GUI 300 generated by an electronic design automation (EDA) tool during an integrated clock gate (ICG) aware power analysis of a synthesized gate level circuit. The exemplary GUI 300 shows ICGs ICG1-ICG9, flops F1-F20, and combination logic clusters CC1-CC15. The exemplary GUI 300 further shows clock buffers, not labeled separately, and various nets carrying the clock signals or the data signals, also not labeled separately. One having ordinary skilled in the art understands that the GUI 300 is merely exemplary and other versions of rendering an integrated circuit (IC) schematics and layout are within the scope of this disclosure. One having ordinary skilled in the art further understands that the EDA tool may update the GUI 300 during the process described below.

As shown in the exemplary GUI 300, the EDA tool may select ICGs ICG1, ICG4 to be deactivated and ICGs ICG2, ICG3, ICG5, ICG6, ICG7, ICG8, ICG9 to be activated during the power analysis. Because the ICGs ICG1, ICG4 are inactive, the output cone of the ICGs ICG1, ICG4 may not receive a toggling clock signal. Consequently, flops F1, F2, F6 and combination logic clusters CC1, CC2, CC5 receiving the state propagation from the flops F1, F2, F6 may be inactive as well. However, the rest of the circuit devices are active and the EDA tool may provide a stimulus to these active devices to compute power consumed by these devices.

In a first clock cycle, the EDA tool may propagate the respective states of a first set of active flops F5, F9, F13, F17 through a first set of combination logic clusters CC4, CC7, CC10, CC13 to a second set of active flops F10, F14, F18. More specifically, the EDA tool may propagate: the state of active flop F9 through combination logic cluster CC7 to active flop F10; the state of active flop F13 through combination logic cluster CC10 to active flop F14; and the state of active flop F17 through combination logic cluster CC13 to active flop F18. The EDA tool may further propagate the state of active flop F5 through combination logic cluster CC4 to inactive flop F6. However, flop F6 being inactive may not receive the data propagated from the combination logic cluster CC4. During the first clock cycle, the EDA tool may compute the respective current flowing through each of first set of active flops F5, F9, F13, F17 and/or each of the first set of combination logic clusters CC4, CC7, CC10, CC13. Furthermore, the EDA tool may determine the respective voltages across each of the first set of active flops F5, F9, F13, F17 and/or each of the combination logic clusters CC4, CC7, CC10, CC13. Based on the respective currents and voltages, the EDA tool may calculate the power consumed by each of the first set of active flops F5, F9, F13, F17 and/or each of the combination logic clusters CC4, CC7, CC10, CC13, and the total power consumed by the portion of the circuit active during the first clock cycle.

In a second clock cycle, the EDA tool may propagate the respective states of a second set of active flops F10, F14, F18 through a second set of combination logic clusters CC8, CC11, CC14 to a third set of active flops F3, F7, FR F15, F19. More specifically, the EDA tool may propagate: the state of active flop F10 through combination logic cluster CC8 to active flop F11; the state of active flop F14 through combination logic cluster CC11 to active flop F15; and the state of active flop F18 through combination logic cluster CC14 to active flop F19. Flops F3, F7 may just receive a triggering edge of the clock signal without receiving an input state at the respective input ports. Therefore, the state of the flops F3, F7 may not transition during the power analysis. During the second clock cycle, the EDA tool may compute the respective current flowing through each of second set of active flops F3, F7, F10, F14, F18 and/or each of the second set of combination logic clusters CC8, CC11, CC14. Furthermore, the EDA tool may determine the respective voltages across each of the second set of active flops F3, F7, F10, F14, F18 and/or each of the second set of combination logic clusters CC8, CC11, CC14. Based on the respective currents and voltages, the EDA tool may calculate the power consumed by each of the second set of active flops F3, F7, F10, F14, F18 and/or each of the second set of combination logic clusters CC8, CC11, CC14, and the total power consumed by the portion of the circuit active during the second clock cycle.

In a third clock cycle, the EDA tool may propagate the respective states of a third set of active flops F3, F7, FR F15, F19 through a third set of combination logic clusters CC3, CC6, CC9, CC12, CC15 to a fourth set of active flops F4, F8, F12, F16, F20. More specifically, the EDA tool may propagate: the state of active flop F3 through combination logic cluster CC3 to active flop F4; the state of active flop F11 through combination logic cluster CC9 to active flop F12; the state of active flop F15 through combination logic cluster CC12 to active flop F16; and the state of active flop F19 through combination logic cluster CC15 to active flop F20. During the second clock cycle, the EDA tool may compute the respective current flowing through each of third set of active flops F3, F7, F11, F15, F19 and/or each of the third set of active combination logic clusters CC3, CC6, CC9, CC12, CC15. Furthermore, the EDA tool may determine the respective voltages across each of the third set of active flops F3, F7, FR F15, F19 and/or each of the third set of active combination logic clusters CC3, CC6, CC9, CC12, CC15. Based on the respective currents and voltages, the EDA tool may calculate the power consumed by each of the third set of active flops F3, F7, FR F15, F19 and/or each of the second set of combination logic clusters CC3, CC6, CC9, CC12, CC15, and the total power consumed by the portion of the circuit active during the third clock cycle.

As with the first, second, and third clock cycles, EDA tool may compute power across the downstream circuit devices falling in the output cone of the active ICGs to determine the power consumption of the portion of the circuit active during the clock cycle. Compared to the conventional systems lacking the deterministic modeling of the ICG activity and therefore generating overly pessimistic power analysis, systems and methods described in the present disclosure generate a more realistic power analysis closer to the vector-based analysis.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method for vectorless power analysis, the method comprising:
   receiving, by a computer system, a netlist comprising database records of circuit devices and nets interconnecting the circuit devices forming an integrated circuit, wherein the circuit devices comprise a plurality of integrated clock gaters (ICGs), a plurality of synchronous circuit devices, and a plurality of combinational logic gates;
   calculating, by the computer system, respective slack values associated with the plurality of ICGs based on static timing analysis (STA) of the integrated circuit;
   generating, by the computer system, a priority list containing a portion of the plurality of the ICGs based on the slack values, wherein the ICGs with lower slack values are assigned a higher priority;
   receiving, by the computer system from a user, one or more priority inputs identifying one or more ICGs, in addition to the ICGs in the priority list, to be prioritized during a power analysis;
   selecting, by the computer system, a set of ICGs to be activated during the power analysis based on the generated priority list and the one or more priority inputs received from the user;
   propagating, by the computer system, a set of state stimuli to the circuit devices within the respective output cones of the selected ICGs;
   determining, by the computer system, respective currents introduced by the set of state stimuli across the circuit devices within the respective output cones of the selected ICGs; and
   determining, by the computer system, power consumed by each of the circuit devices within the respective output cones of the selected ICGs based on the respective currents and the respective voltages across each of the circuit devices for a vectorless power analysis of the integrated circuit.

2. The method of claim 1, further comprising:
   determining, by the computer system, a total power consumed by the integrated circuit based on the power consumed by each of the circuit devices within the respective output cones of the selected ICGs.

3. The method of claim 1, wherein the one or more priority inputs identify one or more discrete ICGs to be selected during the power analysis.

4. The method of claim 1, wherein the one or more priority inputs identify a fraction of the ICGs in the priority list to be selected during the power analysis.

5. The method of claim 1, wherein the synchronous circuit devices are selected from the group consisting of a D flip-flop, a T flip-flop, a JK flip-flop, and an SR flip-flop.

6. The method of claim 1, wherein the plurality of combination logic gates are selected from the group consisting of an OR gate, a NOR gate, an AND gate, a NAND gate, an XOR gate, a NOT gate, a multiplexer, and an inverter.

7. The method of claim 1, further comprising:
   determining, by the computer system, that a circuit device is active within an output cone of a selected ICG based upon the global data activity.

8. The method of claim 1, wherein the steps of the method are iteratively repeated for multiple clock cycles.

9. The method of claim 1, further comprising:
   rendering, by the computer system, at least a portion of the integrated circuit in a graphical user interface (GUI).

10. The method of claim 9, further comprising:
    updating, by the computer system, the GUI in response to executing one or more steps of the method.

11. A system for vectorless power analysis of an integrated circuit, the system comprising:
    one or more computers comprising a non-transitory machine-readable media configured to store a plurality of database records of circuit devices and nets interconnecting the circuit devices forming an integrated circuit, wherein the circuit devices comprise a plurality of integrated clock gaters (ICGs), a plurality of synchronous circuit devices, and a plurality of combinational logic gates;
    at least one computer of the one or more computers, the at least one computer coupled to the non-transitory machine readable media storing the plurality of database records and comprising a processor configured to:
        calculate respective slack values associated with the plurality of ICGs based on static timing analysis (STA) of the integrated circuit;
        generate a priority list containing a portion of the plurality of the ICGs based on the slack values, wherein the ICGs with lower slack values are assigned a higher priority;
        receive from a user one or more priority inputs identifying one or more ICGs in addition to the ICGs in the priority list, to be prioritized during a power analysis;
        select a set of ICGs to be activated during the power analysis based on the generated priority list and the one or more priority inputs received from the user;
        propagate a set of state stimuli to the circuit devices within the respective output cones of the selected ICGs;
        determine respective currents introduced by the set of state stimuli states across the circuit devices within the respective output cones of the selected ICGs; and
        determine power consumed by each of the circuit devices within the respective output cones of the selected ICGs based on the respective currents and the respective voltages across each of the circuit devices for a vectorless power analysis of the integrated circuit.

12. The system of claim 11, wherein the processor is further configured to:
    determine a total power consumed by the integrated circuit based on the power consumed by each of the circuit devices within the respective output cones of the selected ICGs.

13. The system of claim 11, wherein the one or more priority inputs identify one or more discrete ICGs to be selected during the power analysis.

14. The system of claim 11, wherein the one or more priority inputs identify a fraction of the ICGs in the priority list to be selected during the power analysis.

15. The system of claim 11, wherein the synchronous circuit devices are selected from the group consisting of a D flip-flop, a T flip-flop, a JK flip-flop, and an SR flip-flop.

16. The system of claim 11, wherein the plurality of combination logic gates are selected from the group consisting of an OR gate, a NOR gate, an AND gate, a NAND gate, an XOR gate, a NOT gate, a multiplexer, and an inverter.

17. The system of claim 11, wherein the processor is further configured to:
   determine, that a circuit device is active within an output cone of a selected ICG based upon the global data activity.

18. The system of claim 11, wherein the processor is further configured to iteratively repeat steps executed by the processor for multiple clock cycles.

19. The system of claim 11, wherein the processor is further configured to:
   render at least a portion of the integrated circuit in a graphical user interface (GUI).

20. The system of claim 11, wherein the processor is further configured to:
   update the GUI in response to executing the one or more steps by the processor.

* * * * *